(12) United States Patent
Miyamoto et al.

(10) Patent No.: US 6,195,884 B1
(45) Date of Patent: Mar. 6, 2001

(54) WIRE HARNESS AND METHOD FOR MANUFACTURING THE SAME

(75) Inventors: Yutaka Miyamoto; Shigeji Kudo; Hiroo Suzuki; Tsutomu Nakayama; Jiro Aikawa, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/140,669

(22) Filed: Aug. 26, 1998

(30) Foreign Application Priority Data

Aug. 27, 1997 (JP) .................................................. 9-230711

(51) Int. Cl.[7] .................................................. H01R 43/00
(52) U.S. Cl. .............................. 29/857; 29/755; 29/33 F; 29/747
(58) Field of Search ........................... 29/857, 748, 747, 29/760, 755, 881, 886, 33 F

(56) References Cited

U.S. PATENT DOCUMENTS

| | | | | |
|---|---|---|---|---|
| 4,136,440 | * | 1/1979 | Brandewie et al. | 29/628 |
| 4,419,817 | * | 12/1983 | Funcik et al. | 29/749 |
| 4,651,413 | * | 3/1987 | Maack et al. | 29/759 |
| 4,803,778 | * | 2/1989 | Cross | 29/857 |
| 5,052,449 | * | 10/1991 | Fukuda et al. | 149/93 R |
| 5,083,369 | * | 1/1992 | Cerda | 29/857 |
| 5,208,977 | * | 5/1993 | Ricard | 29/861 |
| 5,477,606 | * | 12/1995 | Igura | 29/721 |
| 5,485,660 | * | 1/1996 | Pittau | 29/718 |
| 5,687,477 | * | 11/1997 | Soriano | 29/872 |
| 5,829,129 | * | 11/1998 | Ito | 29/857 |
| 5,894,660 | * | 4/1999 | Kobayashi et al. | 29/857 |

FOREIGN PATENT DOCUMENTS

| | | | |
|---|---|---|---|
| 1-13194 | 3/1989 | (JP) . | |
| 5-55994 | 8/1993 | (JP) . | |
| 6-54611 | 7/1994 | (JP) . | |
| 6-188055 | * 7/1994 | (JP) | 29/857 |
| 6-188061 | * 7/1994 | (JP) | 29/857 |
| 6-223646 | 8/1994 | (JP) . | |

* cited by examiner

*Primary Examiner*—Lee Young
*Assistant Examiner*—Minh Trinh
(74) *Attorney, Agent, or Firm*—Sughrue, Mion, Zinn, Macpeak & Seas, PLLC

(57) ABSTRACT

A wire harness is made up of a plurality of partial harnesses. Each of the partial harnesses is arranged such that opposite end portions of a plurality of electric wires having terminals at ends thereof are retained in advance in U-shapes with predetermined intervals provided so as to correspond to a plurality of connectors into which the terminals are inserted, by a plurality of wire clamps juxtaposed at equal pitches on a wire clamping bar. The terminals at the ends of the plurality of electric wires in each of the partial harnesses are inserted into terminal accommodating chambers of predetermined connectors selected from the plurality of connectors, thereby aggregating the partial harnesses into a combined unit.

6 Claims, 14 Drawing Sheets

WIRE HARNESS AND METHOD FOR MANUFACTURING THE SAME

BACKGROUND OF THE INVENTION

1. Field of the Invention

This invention relates to a wire harness and a method and an apparatus for manufacturing the same, and more particularly to the manufacture of one wire harness (or one subharness) by combining a plurality of partial harnesses.

The present application is based on Japanese Patent Application No. Hei. 9-230711, which is incorporated herein by reference.

2. Description of the Related Art

As is known, there are a plurality of wire harnesses used in the electrical wiring of an automobile, including such as an engine harness, an instrument panel harness, a cowl side harness, a door harness, and a roof harness.

As a method and an apparatus for manufacturing such wire harnesses, as shown in FIG. 13, a method and an apparatus are known which use a wire clamping bar 101 in which a multiplicity of wire clamps 100 are juxtaposed at equal pitches. Incidentally, each wire clamp 100 comprises a pair of mutually opposing clamp members 100a, and electric wires are clamped therebetween.

After a plurality of electric wires 102 for forming one wire harness are cut to a predetermined length, opposite end portions thereof are retained by mutual adjacent wire clamps 100 and are held in U-shapes on the wire clamping bar 101. In this state, end processing such as stripping (removal of an insulating sheath) of a wire end and crimping of a terminal is performed.

This wire clamping bar 101 is set in or transferred to a case fitting station 103, and terminals 104 at wire ends are respectively inserted and fitted into terminal accommodating chambers (not shown) of a connector housing (hereafter, simply referred to as the connector) 105 by using an automatic terminal inserting device 107.

A plurality of connectors 105 are arranged in advance on a setting table 106 as shown at reference numerals $105_1$, to $105_4$. The terminals 104 are inserted into and retained in predetermined terminal accommodating chambers of connectors selected from the plurality of connectors $105_1$ to $105_4$ in a predetermined order.

As shown in FIG. 14, the automatic terminal inserting device 107 has a mounting head 108, a pair of terminal gripping claws 109 for a wire connecting portion 104a of the terminal 104 and a pair of wire gripping claws 110 are provided at a lower end of the mounting head 108 in such a manner as to be capable of being raised or lowered and of being opened or closed. Further, a pair of wire clamp plates 111 which can be opened or closed is provided at the lower end of the mounting head 108, and a terminal holding plate 112 is provided between the pair of terminal gripping claws 109 in such a manner as to be capable of being raised or lowered.

Further, the mounting head 108 is provided in such a manner as to be capable of moving close to or away from the wire clamp 100 (or the wire clamping bar 101) and of being raised or lowered with respect to the same. Further, a moving plate 113 for supporting the mounting head 108 is mounted on a supporting frame 114 of the case fitting station 103, and is provided in such a manner as to be horizontally movable with respect to the setting table 106 on which the plurality of connectors 105 are arranged.

Accordingly, according to the automatic terminal inserting device 107, the terminal 104 can be automatically inserted into the connector 105 by repeating the following steps a to d.

a. The mounting head is moved to immediately above desired wire clamp 100 of the wire clap bar 101 by means of the moving plate 113.

b. At the same time as the lowering and raising operation of the mounting head 108, an end portion of the wire 102 including the terminal 104 is gripped by the opening/closing operation of the terminal gripping claws 109, the wire gripping claws 110, and the wire clamp plates 111, and is lifted up from the wire clamp 100 which retained the wire.

c. Then, the mounting head 108 is moved in parallel to the wire clamping bar 101, and is stopped at a position opposing a desired terminal accommodating chamber of the desired connector 105.

d. The mounting head 108 is advanced forward toward the connector 105, and while the terminal 104 is being inserted into the terminal accommodating chamber, the terminal gripping claws 109, the wire gripping claws 110, and the wire clamp plates 111 are opened consecutively beginning at the front side, thereby releasing the wire end portion. Namely, the terminal 104 is automatically inserted and fitted into the predetermined terminal accommodating chamber of the predetermined connector.

Thus, there is an advantage, among others, in that, by using the wire clamping bar 101 in which the multiplicity of wire clamps 100 are juxtaposed, all the end processing of wires, including the cutting, retention, stripping, terminal crimping, and case fitting (insertion and fitting of a terminal into a connector) of a multiplicity of wires which make up one wire harness, can be handled on one side of the wire clamping bar. A method and an apparatus similar to the above-described method and apparatus have been disclosed in Japanese Patent Publication No. Hei. 5-55994.

However, since the engine harness, for example, is made up by numerous wires which generally comprise as many as 200 circuits (the number of wires: 200, the number of both end portions that are retained in U-shapes: 400), the number of connectors that are fitted to the wire ends is also numerous. As such, if end processing is performed with respect to these wires by using a single wire clamping bar, troubles are liable to occur, such as erroneous wiring of wires, erroneous crimping of a terminal, erroneous insertion into a connector, and entanglement of wires or terminals.

On the other hand, to handle numerous wires by a single wire clamping bar, an extremely long bar is required, and not only is a wide working space required, but also a pitch time from the cutting of the wire until completion of final case fitting becomes very long. Hence, the apparatus becomes large and automatic control becomes complex and expensive. Furthermore, if there occurs erroneous wiring or erroneous insertion or the like, since it takes time and trouble in correcting them in an ensuing process, wastage can occur such as discarding the entire wires on the wire clamping bar as defective products.

SUMMARY OF THE INVENTION

An object of the present invention is to eliminate the above-mentioned drawbacks. More specifically, an object of the present invention is to provide a wire harness which can be fabricated in a relatively narrow space in a short time, and in which erroneous wiring of wires, erroneous crimping or insertion of terminals, and entanglement of wires are unlikely to occur, as well as a method and an apparatus for manufacturing the same. In addition, another object of the present invention is to provide a wire harness and a method for manufacturing the same which are suitable for production of a large variety of products in small lots.

In order to achieve the above objects, the present inventors first analyzed various forms of wire harness which are used in a single automobile.

Namely, as shown in FIG. 1, one wire harness WH is provided with a plurality of connectors $C_1$ to $C_5$ and connectors $C_1'$ to $C_4'$ in correspondence with its installation routes. The connectors $C_1$ to $C_5$ are connectors which are proper to a relevant partial harness and in which only terminals of wires making up the partial harness are inserted and fitted, as will be described later. The connectors $C_1'$ to $C_4'$ are hybrid connectors into which terminals of different partial harnesses are respectively inserted and fitted in mixed form.

For example, among a plurality of wires 1 making up a partial harness $H_A$ to one end of which the proper connector $C_1$ is fitted, three wires $1_5$ to $1_7$ are fitted to the proper connector $C_5$. However, other wires $1_1$ and $1_2$ are connected to the hybrid connector $C_1'$, a wire $1_3$ is connected to the hybrid connector $C_2'$, a wire $1_4$ is connected to the hybrid connector $C_3'$, and a wire $1_8$ is connected to the hybrid connector $C_4'$.

Thus, although one connector (the proper connector $C_1$) is fitted to one ends of a plurality of wires, terminals at other ends of these wires are not necessarily inserted and fitted into only one connector (the proper connector $C_5$), but are inserted and fitted into other connectors (hybrid connectors $C_1'$ to $C_4'$) in a distributed manner, so that troubles such as erroneous wiring of wires and erroneous insertion of terminals are liable to occur.

Accordingly, by taking note of the fact that one wire harness (or one sub-harness) is divided into a number of partial harnesses in which terminals of one ends of a group of wires are inserted and fitted into a specific connector (e.g., one of the proper connectors $C_1$ to $C_5$), while terminals at the other ends thereof are inserted and fitted into two or more connectors (e.g., the hybrid connectors $C_1'$ to $C_4'$) in a distributed manner, the present inventors found out that numerous troubles associated with the conventional technique can be overcome by combining these partial harnesses into one unit.

Namely, according to the first aspect of the present invention, there is provided a wire harness comprising a plurality of partial harnesses, wherein each of the partial harnesses is arranged such that opposite end portions of a plurality of electric wires having terminals at ends thereof are retained in advance in U-shapes with predetermined intervals provided so as to correspond to a plurality of connectors into which the terminals are inserted, by a plurality of wire clamps juxtaposed at equal pitches on a wire clamping bar, and wherein the terminals at the ends of the plurality of electric wires in each of the partial harnesses are inserted into terminal accommodating chambers of predetermined connectors selected from the plurality of connectors, thereby aggregating the plurality of partial harnesses into a combined unit. In accordance with the above-described first aspect of the present invention, if a wire harness formed by, for example, about 200 wires is divided into four parts, the wire harness can be formed as partial harnesses each comprising about 50 wires, the partial harnesses can be fabricated in a relatively narrow space by using a short wire clamping bar, and end processing can be performed in a short time. In a case where, for example, two partial harnesses each comprising 50 wires are aggregated as one sub-harness comprising 100 wires, and two sub-harnesses are combined into one wire harness comprising 200 wires, the sub-harness, which is a semifinished product, is also included in the wire harness referred to in the present invention. In addition, each individual partial harness has a small number of wires, erroneous wiring and erroneous insertion of the terminal are unlikely to occur, such troubles can be easily detected, correction thereof is easy, and it is possible to speedily cope with circuit changes such as optional circuits. Furthermore, since the number of wires is small, entanglement of wires and terminals during case fitting is reduced, and smooth end processing can be effected.

According to the second aspect of the present invention, in the wire harness according to the first aspect of the present invention, the plurality of connectors into which the terminals are inserted comprise at least one of connectors proper to a relevant partial harness into which only the terminals of the plurality of electric wires making up each of the partial harnesses are inserted and hybrid connectors into which the terminals of the electric wires of two or more of the partial harnesses are inserted in mixed form. Since the plurality of connectors which are fitted to one wire harness are clearly classified into connectors proper to the partial harness alone and hybrid connectors into which the electric wires of a plurality of partial harnesses are fitted in mixed form, end processing of wires is further systematized and simplified, and programming for automation is facilitated.

According to the third aspect of the present invention, in the wire harness according to the first aspect of the present invention, the proper connector is fitted in advance to the ends of predetermined ones of the electric wires of each of the partial harnesses. As a result, in a final process in which the partial harnesses are aggregated into one wire harness, it suffices if the terminals are consecutively inserted into only the hybrid connectors, thereby simplifying the process of end processing.

According to the fourth aspect of the present invention, in the wire harness according to the first aspect of the present invention, the hybrid connector is fitted in advance to the ends of the electric wires of one or two of the partial harnesses selected from the plurality of partial harnesses. In accordance with the fourth aspect of the present invention, if, for example, all the estimated hybrid connectors are fitted in advance to one partial harness, the wires of the other partial harnesses are not mixed in that partial harness, so that there is no possibility of the occurrence of erroneous wiring. Accordingly, whether the hybrid connectors are to be fitted in advance to the partial harness can be selected as required.

According to the fifth aspect of the present invention, in the wire harness according to the first aspect of the present invention, each of the partial harnesses includes electric wires to stripped ends of which terminals are unconnected, and the stripped ends thereof are jointed in the aggregated state. In a wire harness, so-called joint portions are often present which are formed such that an intermediate portion of a wire is stripped due to the circuit configuration, and an end of another wire is connected thereto, or stripped end portions of two or more wires are connected together by using or without using a joint terminal. In such a case, by jointing the wire ends or the intermediate portion in the final process of aggregating into one wire harness, end processing is facilitated, and the occurrence of erroneous wiring can be prevented. It should be noted that so-called double crimping and triple crimping in which stripped ends of two or more wires are connected to one terminal by crimping or another method can be included in joint processing.

Furthermore, according to the sixth aspect of the present invention, there is provided a method of manufacturing a wire harness from the plurality of partial harnesses according to any one of the first to fifth aspects of the present invention, comprising steps of: a) transferring the wire clamping bar which holds an initial one of the partial harnesses to a wire-harness fabricating station; b) inserting the terminals at the ends of the plurality of electric wires consecutively into predetermined terminal accommodating chambers of predetermined ones of the connectors selected from the plurality of connectors set on a connector receiving jig in the wire-harness fabricating station; c) removing the wire clamping bar which has been emptied; and d) repeating the above steps a) to c) consecutively for ensuing ones of the partial harnesses. Each of the partial harnesses can be fabricated in accordance with a known manufacturing method and by using a known method (e.g., Japanese Patent Publication No. Hei. 5-55994). Accordingly, in accordance with the sixth aspect of the present invention, it suffices if the wire clamping bar for an initial partial harness is transferred to a wire-harness fabricating station (step a)), and if the uninserted terminals of the relevant partial harness are inserted into predetermined terminal accommodating chambers of predetermined connectors in the wire-harness fabricating station (step b)). This step b) can be executed by using the automatic terminal inserting device 107 shown in FIG. 13. Then, if the wire clamping bar which has been emptied of the wires for which insertion of the terminals has been completed is removed, and is transferred to, for instance, an empty-bar placing rack, the processing of one partial harness ends. Thus, by the mere addition of steps a), c), an 4), it is possible to easily manufacture the wire harness by using the known method and apparatus.

According to the seventh aspect of the present invention, the method of manufacturing a wire harness according to the sixth aspect of the present invention further comprises a step of transferring the proper connector fitted in advance to the ends of predetermined ones of the electric wires of each of the partial harnesses to the connector receiving jig in the wire-harness fabricating station. Namely, in a case where a proper connector has been fitted to the partial harness, it suffices if the step of transferring the proper connector to the connector receiving jig in the wire-harness fabricating station is merely added. Consequently, steps a) and b) can be effected smoothly with respect to ensuing partial harnesses as well.

According to the eighth aspect of the present invention, the method of manufacturing a wire harness according to the sixth or seventh aspect of the present invention further comprises a step of collectively jointing, in the wire-harness fabricating station, two or more stripped portions of the electric wires included in each of the partial harnesses. Since the joint processing of the wires is collectively effected in the wire-harness fabricating station, the process is simplified, and erroneous wiring and erroneous connection can be eliminated.

According to the ninth aspect of the present invention, the method of manufacturing a wire harness according to the sixth or seventh aspect of the present invention further comprises a step of jointing, in the wire-harness fabricating station, stripped portions of the ends of the electric wires included in each of the partial harnesses, such that the stripped portions are consecutively superposed one on top of another each time each of the partial harnesses is transferred to the wire-harness fabricating station. Since stripped ends of the wires are jointed and integrated in the end processing of each of the partial harnesses, extra operation for correcting the deformation of the exposed stripped portions due to contact with other wires can be eliminated.

According to the tenth aspect of the present invention, there is provided an apparatus for implementing the method of manufacturing a wire harness according to any one of the sixth to ninth aspects of the present invention, comprising: a wire-harness fabricating station for forming a single wire harness from the partial harnesses, the wire-harness fabricating station having a connector receiving jig for detachably holding the plurality of proper connectors and the plurality of hybrid connectors. Consequently, the method according to the sixth aspect of the present invention, particularly steps a) and b) can be executed reliably.

According to the eleventh aspect of the present invention, in the apparatus for manufacturing a wire harness according to the tenth aspect of the present invention, the wire-harness fabricating station is preferably provided with a connector transferring device for transferring, to the connector receiving jig, the proper connectors and/or hybrid connectors which are fitted in advance to the partial harness. In this case, full automation of the manufacturing method according to the sixth aspect of the present invention including step b) becomes possible.

As described above, in the present invention, one wire harness (or one sub-harness) is formed by a number of partial harnesses in which terminals of one ends of a group of wires are inserted into one connector, and terminals at the other ends thereof are inserted into other connectors in a distributed manner. Therefore, it is possible to provide a wire harness which can be fabricated in a relatively narrow space in a short time, in which erroneous wiring of wires, erroneous crimping or insertion of terminals, and entanglement of wires are unlikely to occur, and which is suitable for production of a large variety of products in small lots, as well as a method and an apparatus for manufacturing the same.

DETAILED DESCRIPTION OF THE PREFERRED EMBODIMENTS

Referring now to the accompanying drawings, a detailed description will be given of an embodiment of the present invention.

Figure 1:
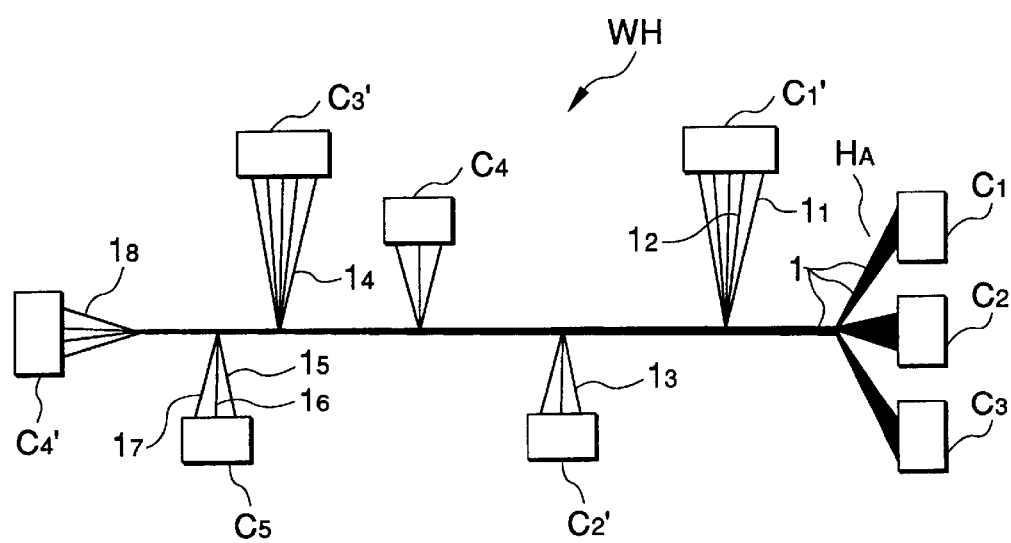
FIG. 1 is a diagram illustrating a general form of a wire harness, which is used for explaining the present invention.
Figure 2A:
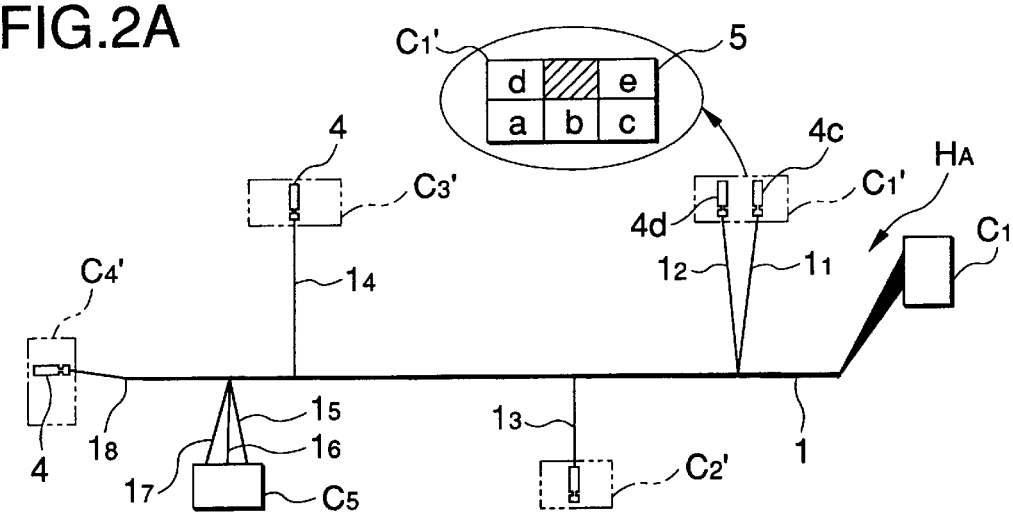
FIGS. 2A to 2C are diagrams respectively illustrating partial harnesses $H_A$, $H_B$, and $H_C$ making up the wire harness in accordance with an embodiment of the present invention.
Figure 2B:
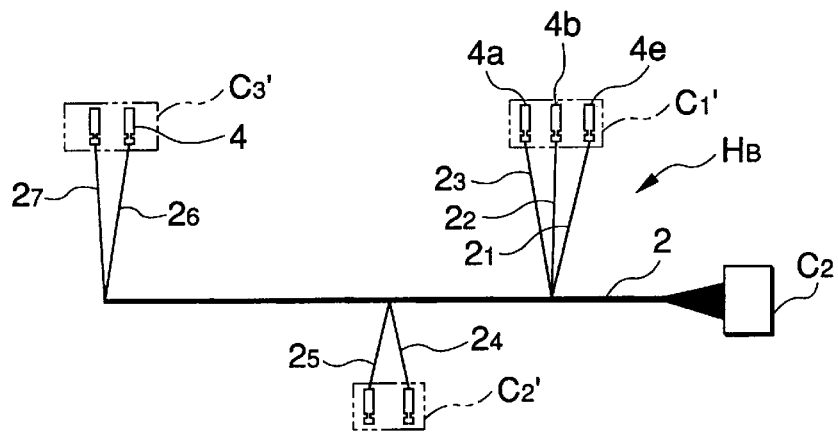
Figure 2C:
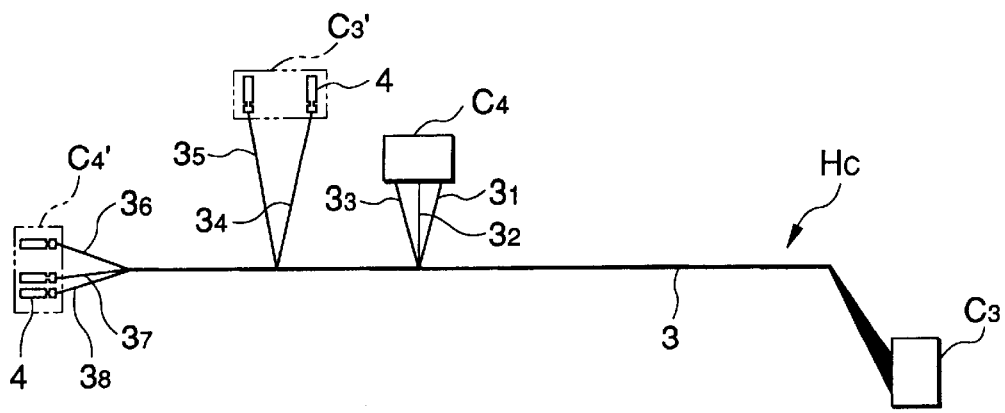

FIGS. 2A to 2C respectively show states in which three partial harnesses $H_A$, $H_B$, and $H_C$ which make up a wire harness WH shown in FIG. 1 are developed two-dimensionally in correspondence with actual forms of routing. In the drawings, a thick line indicates a plurality of electric wires, and a thin line indicates a single electric wire.

All terminals (not shown) at one end of a group of electric wires 1 which make up the partial harness $H_A$ are inserted and fitted in a proper connector $C_1$. The other end of the group of electric wires 1 extends along the arrangement of predetermined hybrid connectors $C_1'$–$C_4'$ and a proper connector $C_5$ of the wire harness WH. The proper connector $C_5$ is fitted to the ends of three wires $1_5$–$1_7$ among the wires. Since terminals 4 connected to the ends of the other wires $1_1$, $1_2$, $1_3$, $1_4$, and $1_8$ are inserted and fitted in hybrid connectors $C_1'$, $C_2'$, $C_3'$, and $C_4'$ by being respectively mixed with the wires of the other partial harnesses $H_B$ and $H_C$, these terminals 4 are in an exposed state.

Similarly, a proper connector $C_2$ is fitted to one end of a group of electric wires 2 of the partial harness $H_B$, while electric wires $2_1$, $2_2$, $2_3$, $2_4$, $2_5$, $2_6$, and $2_7$ on the other end side extend to corresponding hybrid connectors $C_1'$, $C_2'$, and $C_3'$, respectively. The terminals 4 connected to the respective ends are exposed.

In addition, a proper connector $C_3$ is fitted to one end of a group of electric wires 3 of the partial harness $H_C$, while a proper connector $C_4$ is fitted to wires $3_1$, $3_2$, and $3_3$ on the other end side, and the remaining wires $3_4$, $3_5$, $3_6$, $3_7$, and $3_8$ extend to corresponding hybrid connectors $C_3'$ and $C_4'$, respectively. The terminals 4 connected to the respective ends are exposed.

Thus, the connectors $C_1$, $C_2$, and $C_3$ proper to the relevant partial harnesses are respectively fitted to one ends of the groups of wires 1, 2, and 3 which respectively make up the partial harnesses $H_A$, $H_B$, and $H_C$, and the other end sides of the groups of wires are provided with the terminals 4 in the hybrid connectors $C_1'$ to $C_4'$. At the same time, proper connectors such as the connectors $C_4$ and $C_5$ are fitted, as required, to the wires in which other partial harnesses are not present in mixed form.

Figure 3A:
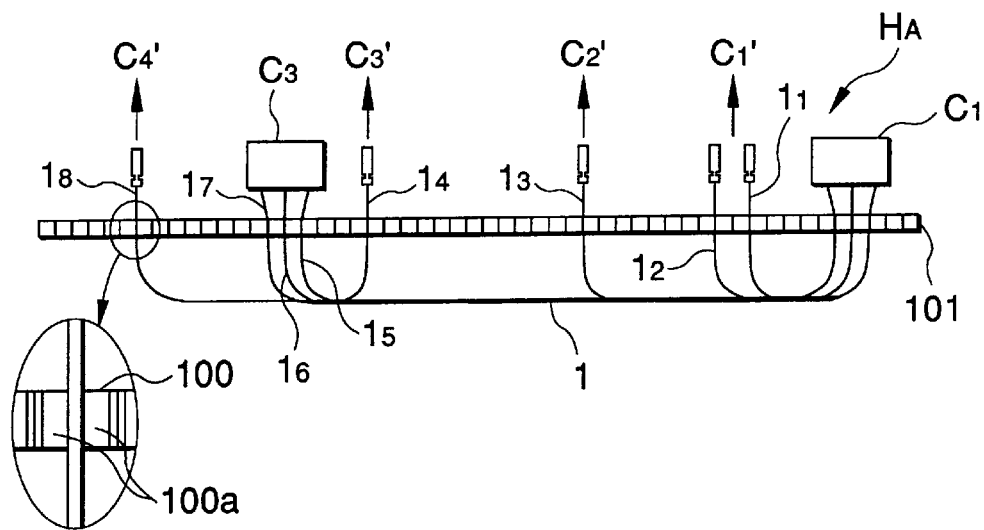
FIGS. 3A to 3C are diagrams illustrating states in which the partial harnesses $H_A$, $H_B$, and $H_C$ corresponding to FIGS. 2A, 2B, and 2C are respectively retained by wire clamping bars.
Figure 3B:
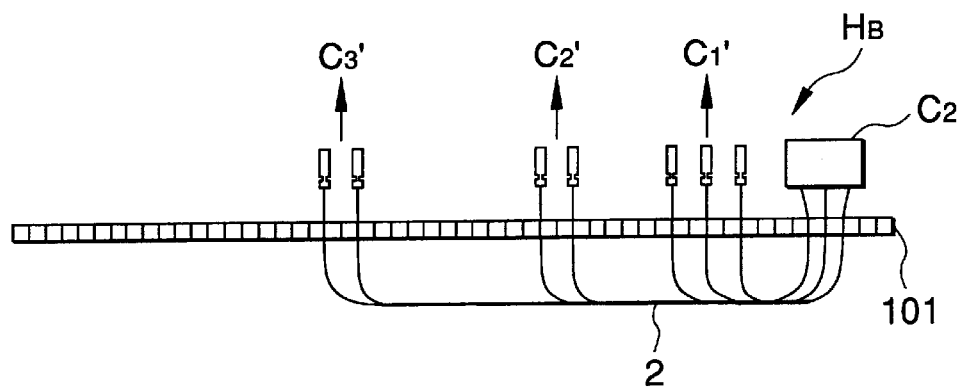
Figure 3C:
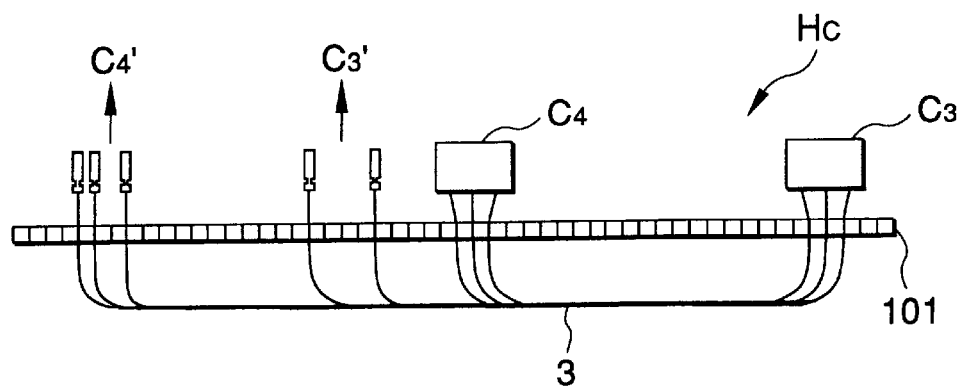
Figure 13:
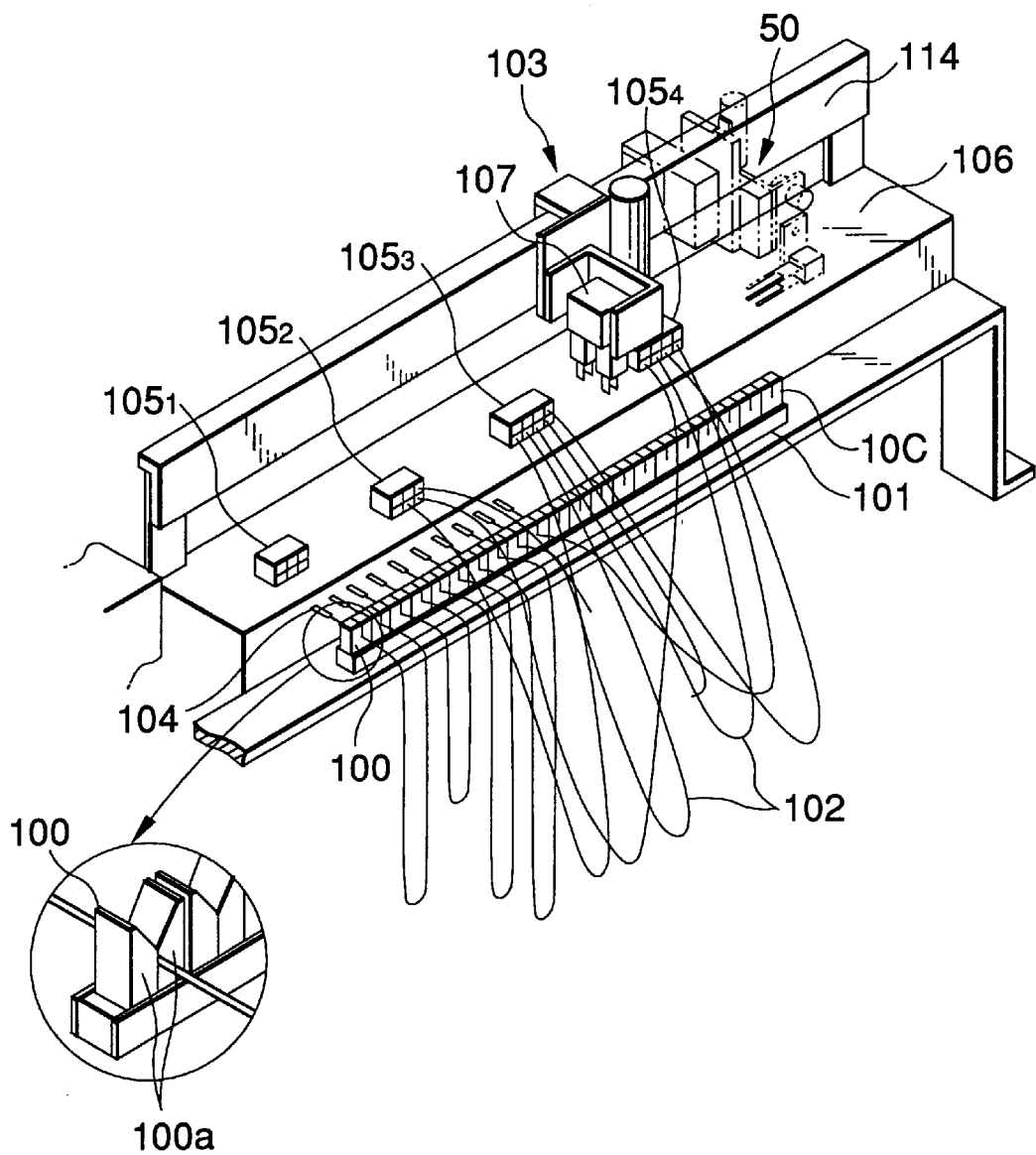
FIG. 13 is a diagram illustrating a conventional wire-harness manufacturing apparatus.

FIGS. 3A to 3C show states in which the groups of wires 1, 2, and 3 of the partial harnesses $H_A$, $H_B$, and $H_C$ corresponding to FIGS. 2A to 2C are respectively retained by wire clamps 100 of a wire clamping bar 101 shown in FIG. 13.

In FIG. 3A, all one ends of the group of wires 1 which make up the partial harness $H_A$ are collectively retained on the right end side in the drawing of the wire clamping bar 101, and the proper connector $C_1$ is thus fitted. The other end sides of the group of wires 1 are respectively retained in U-shapes with appropriate intervals so as to correspond to the hybrid connectors $C_1'$ to $C_4'$ and the proper connector $C_5$, respectively.

Namely, the two wires $1_1$ and $1_2$ are retained close to the proper connector $C_1$, one wire $1_8$ is retained on the left end side, and the wires $1_3$, $1_4$, and $1_5$, $1_6$, and $1_7$ are retained between them consecutively from the right-hand side. Of these wires, as explained with reference to FIG. 2A, the terminals (not shown) at opposite ends of the three wires $1_5$ to $1_7$ are already inserted and fitted in the proper connectors $C_1$, and $C_5$, and the terminals 4 at the ends of the remaining wires $1_1$ to $1_4$ and $1_8$ are in an uninserted state. It should be noted that the group of wires 1 on the proper connector $C_1$ side and the wires $1_5$ to $1_7$ of the proper connector $C_5$ should preferably be retained in a vertical row by one wire clamp 100 after the insertion and fitting of the terminals to the connectors, as will be explained later .

Since the retention of the other partial harnesses $H_B$ and $H_C$ in the wire clamping bar 101 in FIGS. 3B and 3C is carried out in the same way as the partial harness $H_A$, a description thereof will be omitted.

In the partial harness $H_A$ in FIG. 3A, the proper connectors $C_1$, and $C_5$ are already fitted to required portions of the group of wires 1, but the connectors $C_1$ and $C_5$ may be fitted in a wire-harness fabricating station which will be described later. If, to the contrary, not only the aforementioned proper connectors $C_1$ and $C_5$ but the hybrid connectors $C_1'$ to $C_4'$ are fitted advance in the stage of the partial harness $H_A$ the number of uninserted terminals in the partial harness $H_A$ can be reduced to an extremely small level.

In addition, if the hybrid connector $C_1'$, for example, is a waterproof connector, waterproof rubber caps (not shown) should preferably be applied in advance to its connection wires $1_1$ and $1_2$ in the stage of the partial harness $H_A$ before connection to the terminals 4.

It should be noted that wires which are stripped at one ends or both ends and whose terminals are unconnected may also be retained at the wire clamping bar 101 of the partial harness $H_A$ in preparation for the crimping or jointing of terminals of special sizes.

The other partial harnesses HB and $H_C$ are arranged in the same way as the partial harness $H_A$.

Since the partial harnesses $H_A$, $H_B$, and $H_C$ shown in FIGS. 2A to 2C and FIGS. 3A to 3C can be fabricated by using a conventional apparatus such as a case fitting station 103 shown in FIG. 13 and in accordance with a conventional method as described above, a detailed description of the manufacture of the partial harness itself will be omitted.

Figure 4:
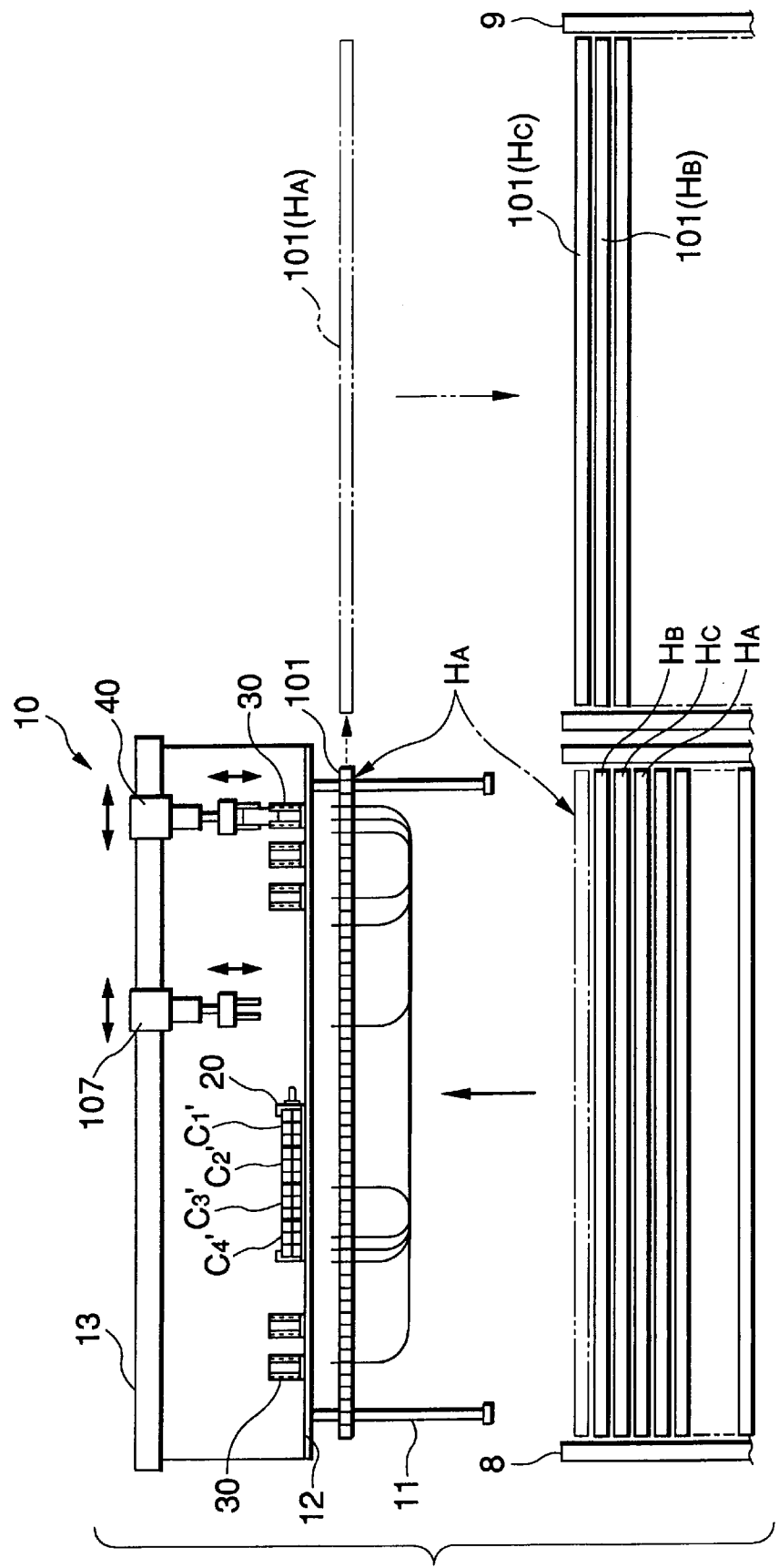
FIG. 4 is a schematic diagram illustrating an embodiment of a device for forming the partial harnesses $H_A$, $H_B$, and $H_C$ shown in FIGS. 2A to 2C and 3A to 3C into one wire harness.

FIG. 4 is an explanatory diagram of a wire-harness fabricating station 10 illustrating an embodiment of a wire-harness manufacturing apparatus in accordance with the present invention, as well as a partial-harness placing rack 8 and an empty-bar placing rack 9.

The station 10 is provided with a stand 11 for supporting and fixing the wire clamping bar 101 on this side, a connector setting table 12 in the middle, and a supporting frame 13 on the rear side. Arranged on the connector setting table 12 are a connector receiving jig 20 for the hybrid connectors $C_1'$ to $C_4'$ and connector receiving jigs 30 for the proper connectors $C_1$ to $C_5$.

Figure 14:
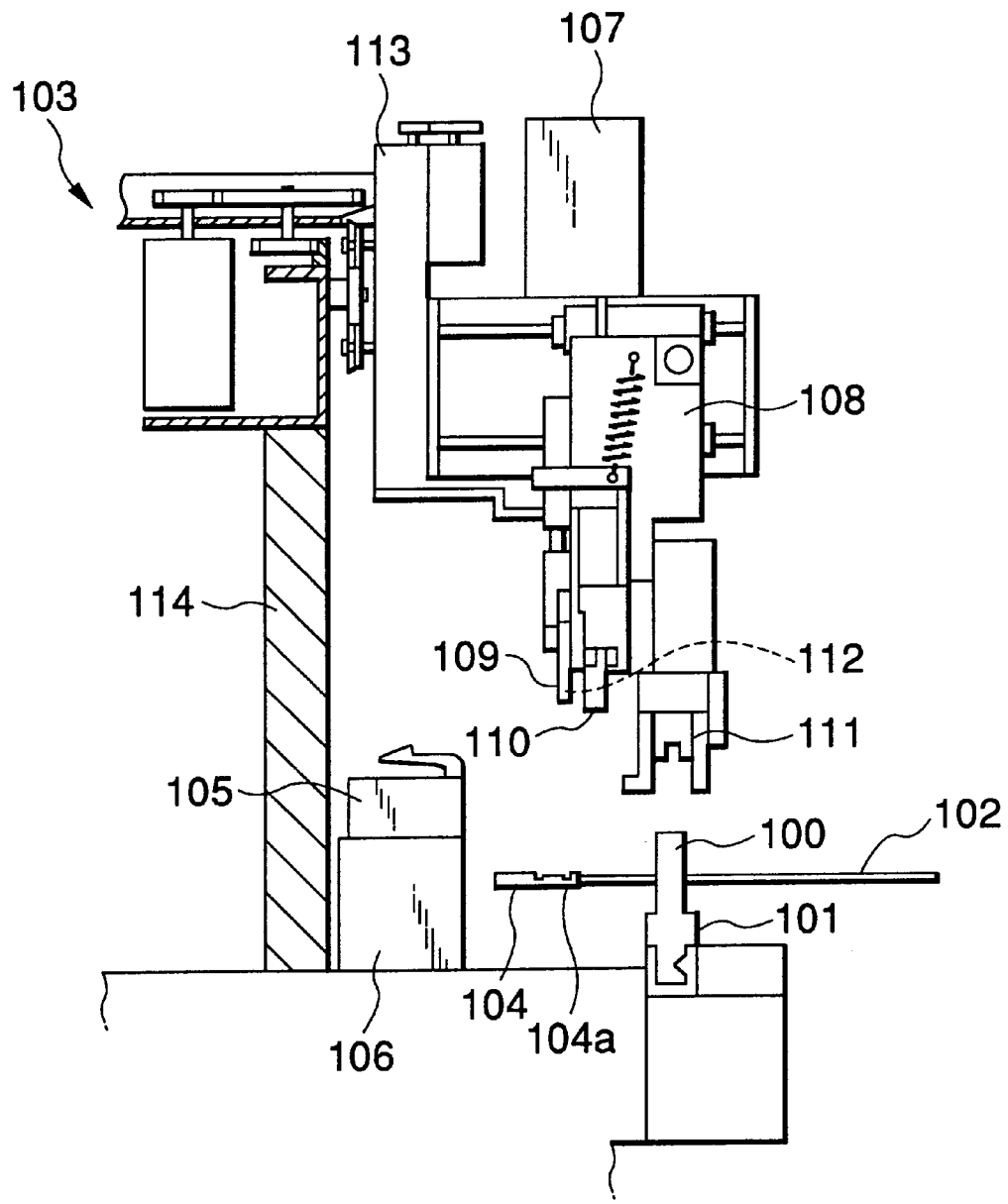
FIG. 14 is a diagram illustrating a conventional terminal inserting device.

In addition, a connector transferring device 40 and a mounting head 108 of the aforementioned automatic terminal inserting device 107 (see FIGS. 13 and 14) are mounted on the supporting frame 13 in such a manner as to be movable in parallel to the frame 13. It should be noted that the pair of terminal gripping claws 109, the pair of wire gripping claws 110, and the pair of wire clamp plates 111 are openably provided on this mounting head 108 in such a manner as to be capable of being raised or lowered between the stand 11 and the connector setting table 12 and capable of moving close to or away from the same.

Next, referring to FIGS. 4 and 5, a description will be given of a method of manufacturing one wire harness WH from a plurality of partial harnesses H.

Figure 5:
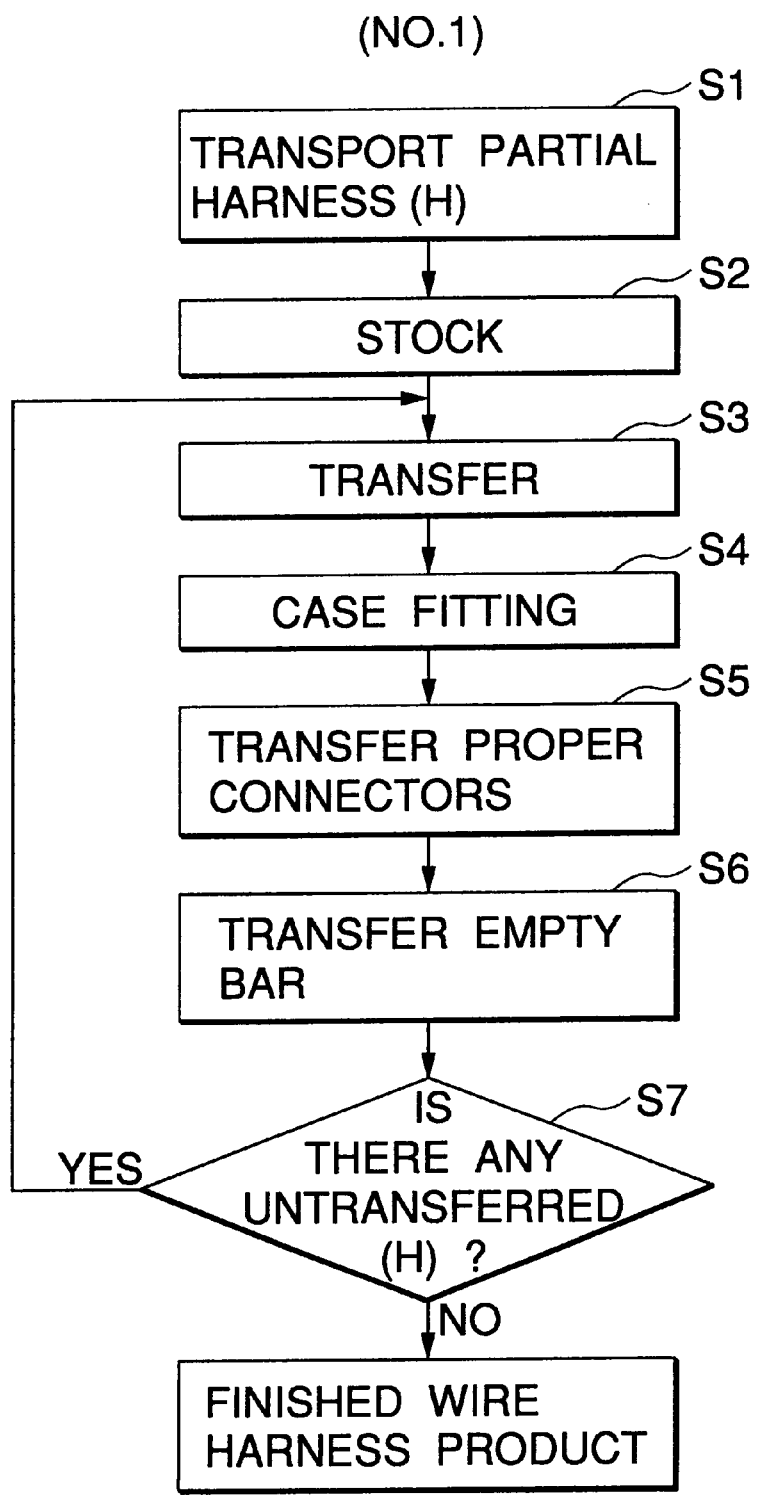
FIG. 5 is flowchart on manufacturing steps illustrating an embodiment of a method of manufacturing a wire harness in accordance with the present invention.

First, as shown in the flowchart in FIG. 5, in Step S1, the partial harnesses $H_A$, $H_B$, and $H_C$ fabricated in a known method as described above are consecutively transported, and are placed and stocked on the partial-harness placing rack 8 located in front of the wire-harness fabricating station 10 in accordance with the processing order (Step S2).

Next, in Step S3, the initial partial harness $H_A$ among the stocked partial harnesses H is transferred to the stand 11 of the station 10 by an unillustrated transfer hand.

At the same time as this transfer or prior to the transfer, the hybrid connectors $C_1'$ to $C_4'$ to be fitted to the wire harness WH are set in a horizontal row in the connector receiving jig 20 of the station 10.

In Step S4, the uninserted terminals 4 of the transferred partial harness $H_A$ are respectively inserted and fitted into terminal accommodating chambers 5 of predetermined hybrid connectors C' (case fitting). The insertion and fitting is automatically effected by the aforementioned automatic terminal inserting device 107, and control is provided such that entanglement with the inserted wires is reduced and the traveling and operating time of the device 107 is minimized. Namely, the case fitting is effected by repeating the step of inserting the terminals 4 of the predetermined wires 1 consecutively into the predetermined terminal accommodating chambers 5 of the predetermined hybrid connectors C'. For instance, as shown in FIGS. 2A and 2B, in a case where the hybrid connector $C_1'$ has five terminal accommodating chambers 5 (a to e) in two upper and lower stages, the terminals 4c and 4d of the wires $1_1$ and $1_2$ are inserted into the c-th and d-th terminal accommodating chambers 5. Then, the a-th, b-th, and e-th terminal accommodating chambers 5 in the middle are left vacant in preparation for the terminals 4a, 4b, and 4e of the wires $2_1$ to $2_3$ of the ensuing partial harness $H_B$.

In Step S5, with respect to the partial harness $H_A$ for which case fitting has been completed, since the proper connectors $C_1$ and $C_5$ are held on the wire clamping bar 101 through the group of wires 1, these proper connectors $C_1$ and $C_5$ are transferred to the connector receiving jigs 30 by the connector transferring device 40. As a result, the wire clamping bar 101 becomes empty.

It should be noted that a detailed description will be given later of the holding of the proper connectors $C_1$ and $C_5$ by the wire clamping bar 101, as well as the connector receiving jigs 30 and the connector transferring device 40. In addition, as will be easily understood, the order of the steps of case fitting in Step S4 and the transfer of the proper connectors in Step S5 may be reversed.

In Step S6, the wire clamping bar 101 which has been emptied of the partial harness $H_A$ is transferred, and is stocked on the empty-bar placing rack 9, for example.

In step S7, a determination is made as to whether or not there is any untransferred partial harness H in the wire-harness fabricating station 10. If YES is the answer, Steps S3 to S6 are repeated, whereas if NO is the answer, all the process ends, and the completed wire harness WH is obtained. In this embodiment, following the partial harness $H_A$, Steps S3 to S6 are consecutively repeated with respect to the partial harnesses $H_B$ and $H_C$.

Figure 6:
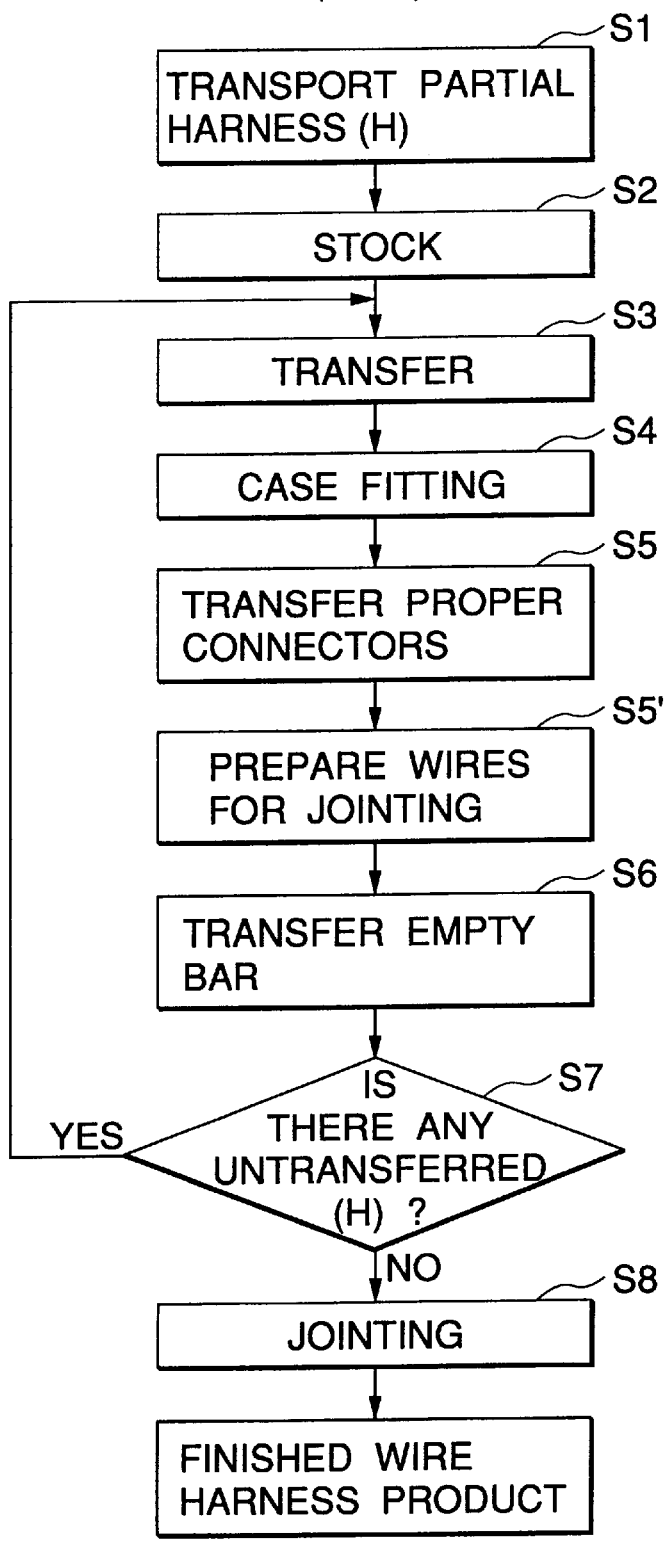
FIG. 6 is a flowchart on manufacturing steps illustrating another embodiment of the method of manufacturing wire harness in accordance with the present invention.

The flowchart shown in FIG. 6 is for the case of jointing the wires when the partial harnesses H are processed by the wire-harness fabricating station 10.

In this case, the step of preparing wires for jointing (Step S5') is added between the aforementioned Steps S5 and S6, and the step of collectively jointing the joint wires (Step S8) is added after Step S7.

As for the preparation of the wires for jointing in Step S5', in a case where wires which are stripped at one ends or both ends and do not have terminals are retained in U-shapes at the wire clamping bar 101 in the stage of each partial harness H, the stripped portions are removed from the wire clamp 100, are placed on a single clamp or an anvil of a welding machine (neither are shown) set on the connector setting table 12, and are consecutively secured temporarily thereby. In a final Step S8, these stripped portions are collectively jointed by one of various methods. The jointing can be effected by a known method such as crimping, soldering, or ultrasonic welding.

Incidentally, instead of being retained at the wire clamping bar in the stage of the partial harness H, the wires for jointing may be carried in from another stock site and may be retained for the first time after the processing in Step S5 for the partial harnesses $H_A$, $H_B$, and $H_C$ is completed. In addition, it is possible to effect attachment or terminal processing of special wires, such as shielded wires, instead of the wires for jointing or in conjunction with such wires.

In the flowcharts shown in FIGS. 5 and 6, although a description has been given of the example in which the partial harnesses H are temporarily stocked on the partial-harness placing rack 8 in Step S2, the partial harnesses H may be consecutively transported from the place of fabrication of the partial harnesses by omitting Step S2, and may be directly transferred to the wire-harness fabricating station 10.

Figure 7A:
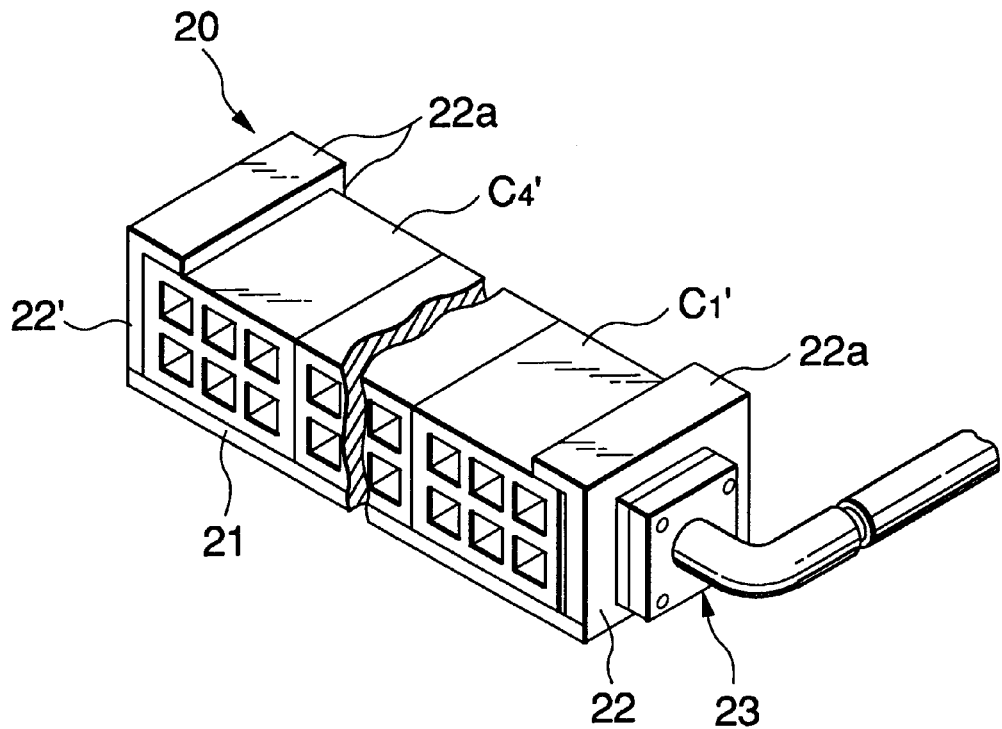
FIG. 7A is a perspective view of a connector receiving jig for hybrid connectors C' in accordance with the present invention.
Figure 7B:
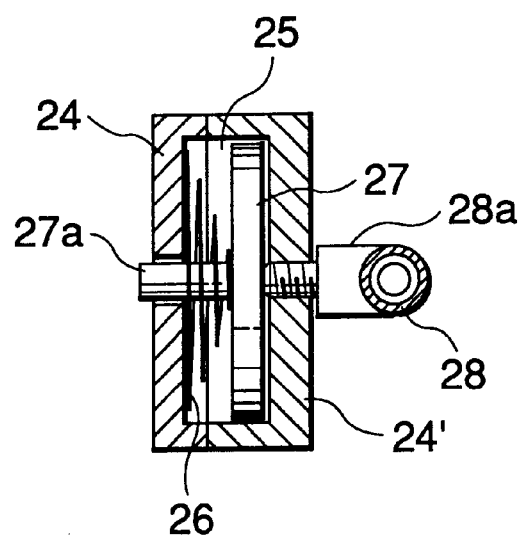
FIG. 7B is a cross-sectional view of an air cylinder unit 23 of the connector receiving jig.
Figure 8:
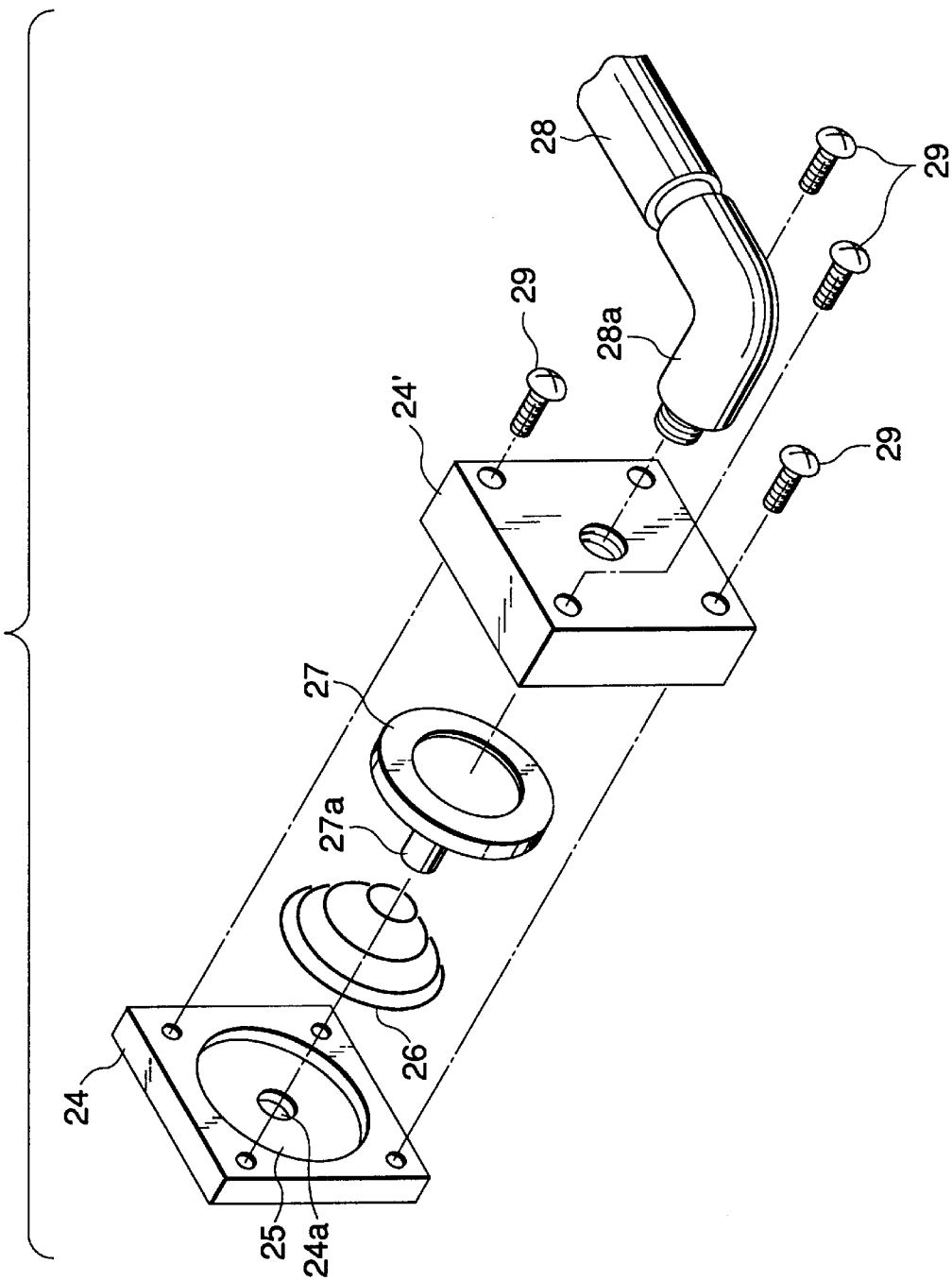
FIG. 8 is an exploded perspective view of the air cylinder unit 23.

FIGS. 7A and 7B show the connector receiving jig 20 for the hybrid connectors C', in which FIG. 7A is a perspective view thereof and FIG. 7B is a cross-sectional view of an air cylinder 23. FIG. 8 shows an exploded perspective view of the air cylinder 23.

The connector receiving jig 20 is a substantially U-shaped frame member which is made up of a base 21, a pair of upright side plates 22 and 22' on both sides, and coming-off prevention pieces 22a formed by being bent into L-shapes at upper ends and rear ends of the side plates. The base 21 is formed in such a manner as to be elongated in the horizontal direction so as to be able to collectively support and fix the hybrid connectors C', i.e., four hybrid connectors $C_1'$ to $C_4'$ in the illustrated example, in a horizontal row, but may be formed in a compact size to fix each of the individual hybrid connectors $C_1'$, $C_2'$, . . . Further, an attaching window (not shown) is provided on one side plate 22 (the right-hand side plate in the drawing) of the connector receiving jig 20, and an air cylinder unit 23 for tightening and fixing the hybrid connectors C' is attached thereto.

As shown in FIGS. 7B and 8, the air cylinder unit 23 is constructed such that a piston 27 is slidably fitted in a cylinder 25, which is formed by a front cover 24 and a rear cover 24', via a spring 26, and a piston bar 27a is caused to project and retract through a hole 24a in the front cover 24, so as to fix the hybrid connectors C' by causing a tip of the piston bar 27a to press the hybrid connectors C' against the other side plate 22'. In the drawings, reference numeral 28 denotes an air tube; 28a, a joint; and 29, a screw 29.

Incidentally, the stroke of the piston bar 27a is sufficient if it is 1 to 2 mm or thereabouts, and it suffices if the stroke makes it possible to effect smooth insertion and withdrawal of the hybrid connectors C' with respect to the connector receiving jig 20 and effect sufficient tightening, fixing, and positioning.

Thus, since the connector receiving jig 20 having a fixing means such as the air cylinder unit 23 is provided on the connector setting table 12, the attachment and removal of the plurality of hybrid connectors $C_1'$ to $C_4'$ can be easily performed automatically or manually, and the hybrid connectors $C_1'$ to $C_4'$ can be secured positively.

Figure 9:
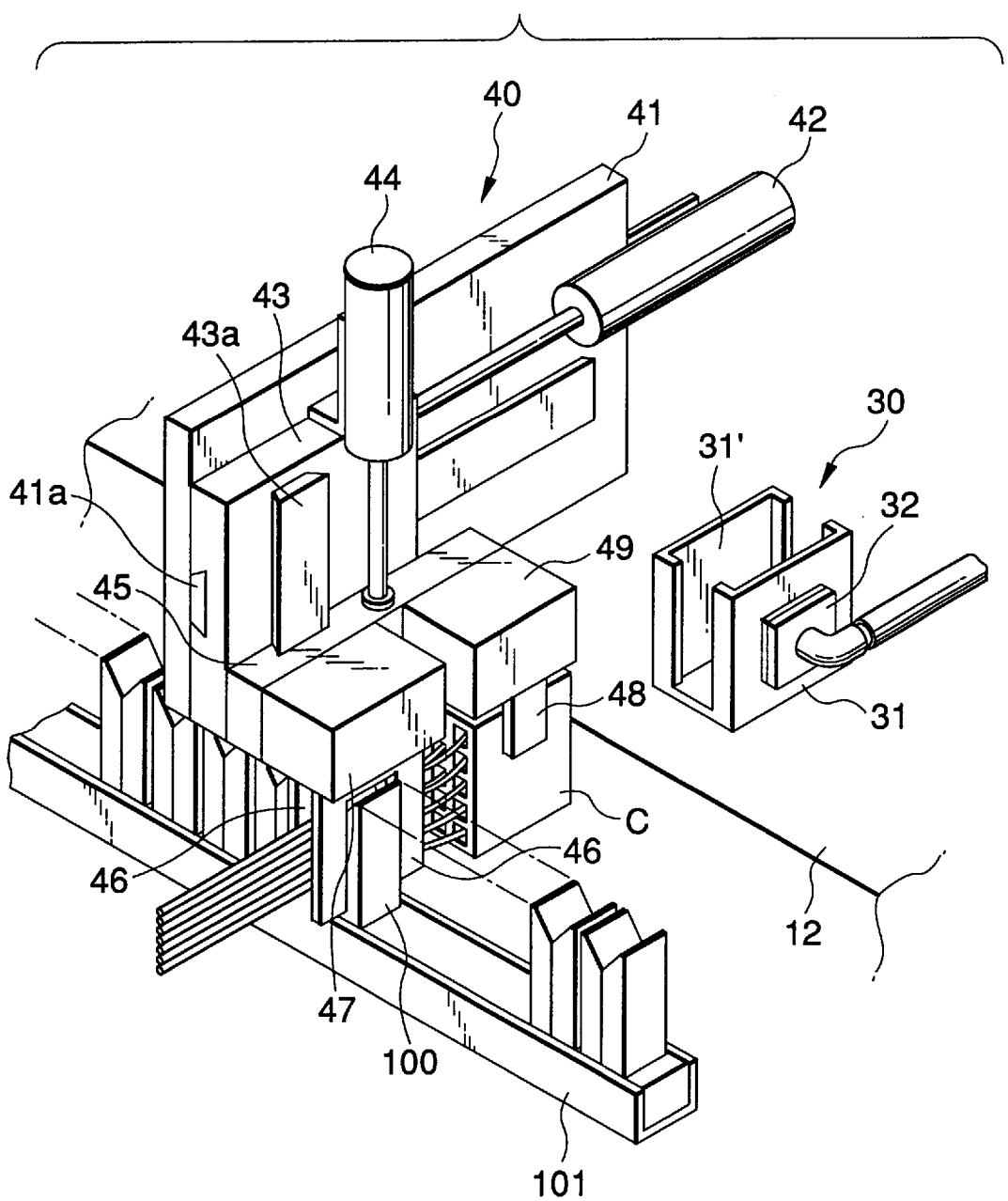
FIG. 9 is a perspective view of a connector transferring device 40 for transferring the connector, into which terminals have been inserted and fitted, from the wire clamping bar to a wire-harness fabricating station.

FIG. 9 shows the connector transferring device 40 and the connector receiving jig 30 for the proper connector C.

The connector receiving jig 30 has a pair of mutually opposing U-shaped side plates 31 and 31' for inserting or removing the proper connector C in the vertical direction. An air cylinder unit 32 is attached to one side plate 31. Since this air cylinder unit 32 is similar to the above-described air cylinder unit 23, a description thereof will be omitted.

The connector transferring device 40 has a mounting base 41 which is mounted perpendicular to the supporting frame 13 in the wire-harness fabricating station 10 and in such a manner as to be horizontally movable with respect to the frame 13.

A horizontally moving plate 43, which advances or retracts in parallel to the base 41 by means of a cylinder 42, is slidably mounted on the mounting base 41, and a raising/lowering plate 45, which reciprocates vertically by means of a cylinder 44, is mounted on the horizontally moving plate 43. Attached to the raising/lowering plate 45 are a clamp head 47 having a pair of openable wire clamp plates 46 as well as a hand head 49 having a pair of openable connector hands 48. In the drawing, reference numerals 41a and 43a denote guide rails, respectively.

Next, referring to FIGS. 10A to 10D, a description will be given of the transfer of the proper connector C to the connector receiving jig 30 in the aforementioned Step S5.

Figure 10A:
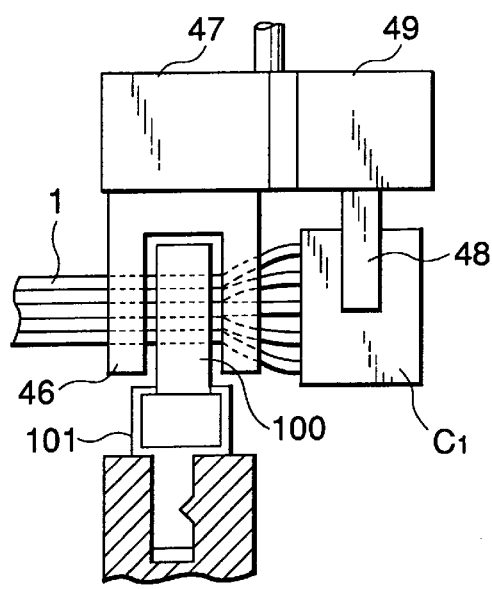
FIGS. 10A to 10D are diagrams respectively illustrating the operation of the connector transferring device 40 shown in FIG. 9.
Figure 10B:
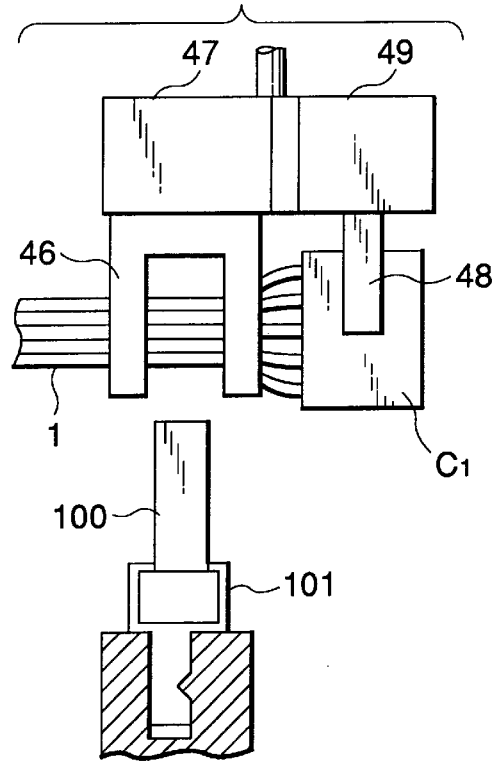

First, by moving the mounting base 41 in parallel to the supporting frame 13, as shown in FIG. 10A, the connector transferring device 40 is stopped immediately above the wire clamp 100 where the proper connector $C_1$ and its group of wires 1 are retained vertically at the wire clamping bar 101 for the partial harness $H_A$, and the wire clamp plates 46 and the connector hands 48 are lowered in open states by means of the cylinder 44.

Figure 10C:
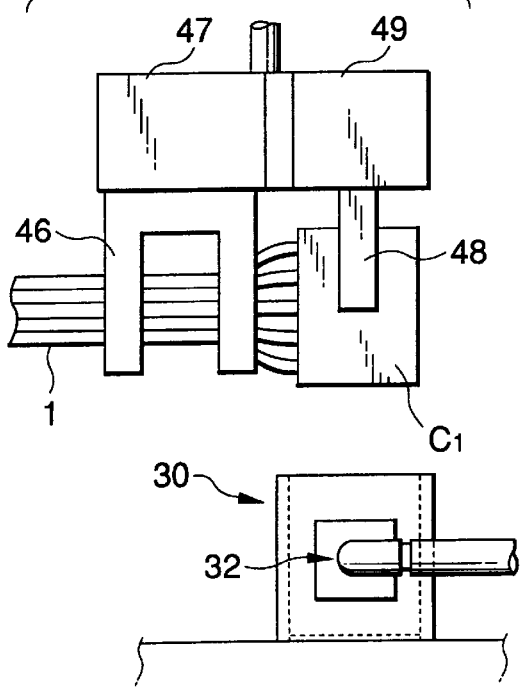

Next, as shown in FIG. 10C, through the aforementioned parallel movement of the mounting base 41 and the driving of the cylinder 42, the proper connector $C_1$ gripped by the connector hands 48 is moved to immediately above the connector receiving jig 30.

Figure 10D:
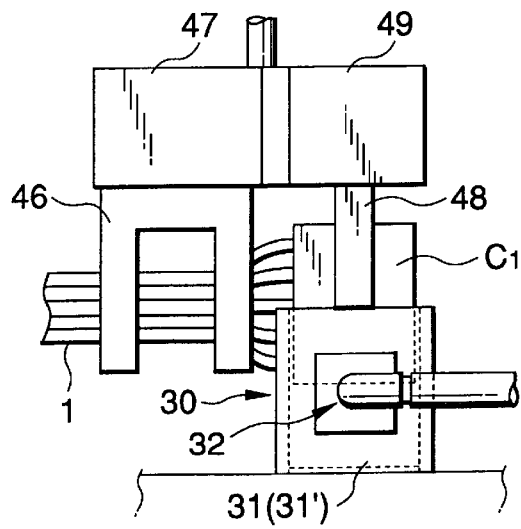

Finally, as shown in FIG. 10D, the connector hands 48 are lowered by the driving of the cylinder 44, the proper connector $C_1$ is inserted between the pair of side plates 31 and 31' of the connector receiving jig 30, and the proper connector $C_1$ is fixed by the air cylinder unit 32. As a result, the transfer of the proper connector $C_1$ from the wire clamping bar 101 to the wire-harness fabricating station 10 is completed.

It should be noted that if it is unnecessary to insert a terminal into the proper connector, there is no need for fixing and positioning the connector inside the connector receiving jig 30 by means of the air cylinder unit 32, and it suffices if the connector does not fall off the connector receiving jig 30.

As described above, in the wire-harness fabricating station 10, if a plurality of connector receiving jigs 30 are set so that the proper connectors $C_1$ to $C_5$ fitted to the partial harnesses H can be fixed or placed in vertically oriented states, it is possible to reduce the space for the connector setting table 12, hence, the station 10 itself, and to reduce the traveling distance necessary for processing by the aforementioned automatic terminal inserting device 107 and the connector transferring device 40.

Figure 11:
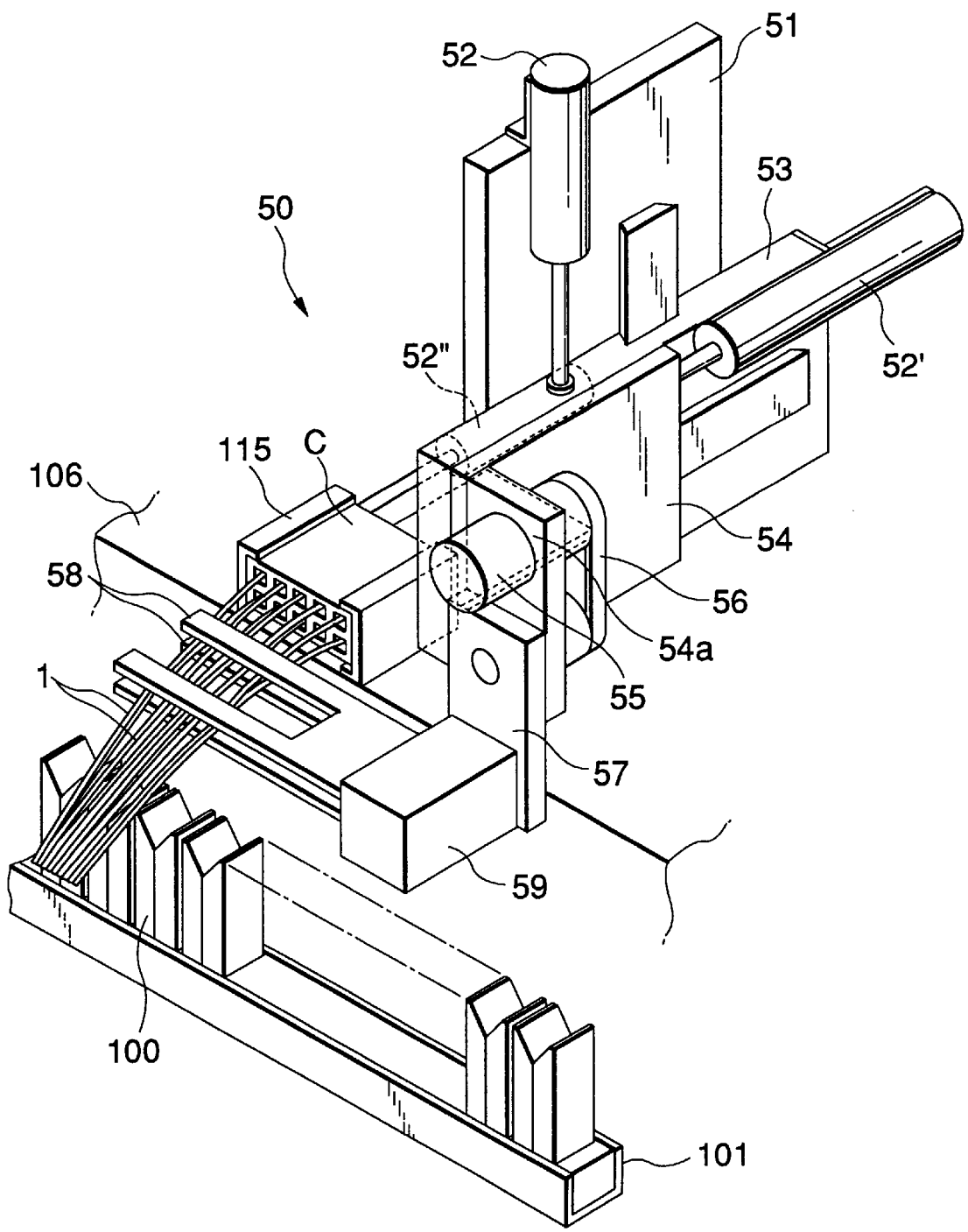
FIG. 11 a perspective view of a second connector transferring device for retaining at the wire clamping bar the connector into which terminals have been inserted and fitted.

FIG. 11 shows a second connector transferring device 50 used in the stage of fabrication of each partial harness H.

In the conventional case fitting station 103 shown in FIG. 13, a plurality of connectors $105_1$, to $105_5$ are arranged in horizontally oriented states on a setting table 106.

Accordingly, the proper connectors C ($C_1$ to $C_5$) of the partial harnesses ($H_A$, $H_B$, and $H_C$) in the present invention are also held in horizontally oriented states on the wire clamping bar 101, as shown in FIGS. 2A to 2C. However, these proper connectors C together with the wires should be preferably retained and held in vertically oriented states, as described above with reference to FIGS. 10A to 10D.

Therefore, the station for manufacturing the partial harnesses H in the present invention is equipped with the connector transferring device 50, and it is recommended that the wires for which casing fitting has been completed and the proper connectors C be held in vertically oriented states in the stage of the partial harness H.

The second connector transferring device 50 has, for example, a mounting base 51 which is mounted perpendicular to a supporting frame 114 in the case fitting station 103 in FIG. 13 and in such a manner as to be horizontally movable with respect to the frame 114.

A raising/lowering plate 53, which moves vertically by means of a cylinder 52, is slidably mounted on the mounting base 51, and a horizontally moving plate 54, which advances or retracts in parallel to the raising/lowering plate 53 by means of a cylinder 52', is mounted on the raising/lowering plate 53. Further, a rotary head 57, which rotates 90° by means of a pulley 56 by the rotation of a motor 55, is pivotally attached to a front plate portion 54a of the horizontally moving plate 54. A clamp head 59 having a pair of openable wire clamp plates 58 is fixed to the rotary head 57.

It should be noted that the setting table 106 should be preferably provided with a connector receiving jig 115 for the proper connector C and a cylinder 52" for advancing and retracting the same.

Next, referring to FIG. 11 and FIGS. 12A to 12D, a description will be given of the transfer of the proper connector C in the partial harness H.

Figure 12A:
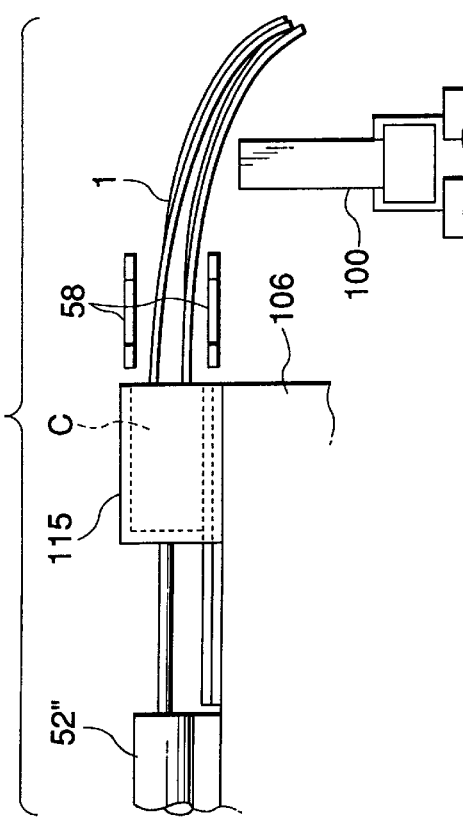
FIGS. 12A to 12D are diagrams respectively illustrating the ration of the second connector transferring device shown in FIG. 11.

In FIGS. 11 and 12A, the proper connector C in a horizontally oriented state is fitted to the ends of the group of wires 1, and the connector C is held in the connector receiving jig 115. The pair of wire clamp plates 58 has an opening extending in the horizontal direction, and is located in such a manner as to clamp the group of wires 1 from upper and lower directions. Further, the retention of the group of wires 1 by the wire clamp 100 has been canceled.

Figure 12C:
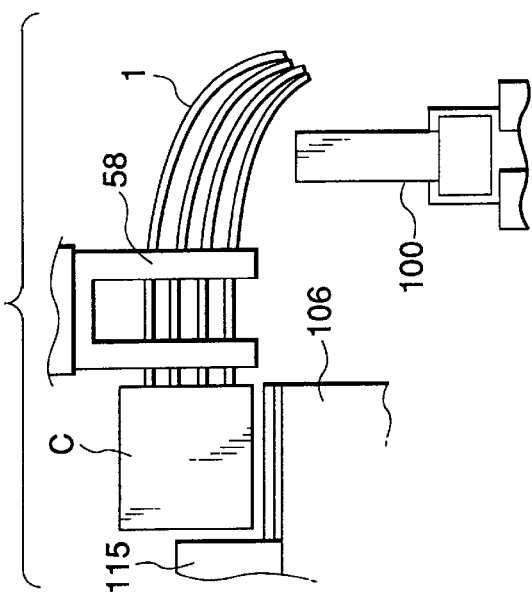
Figure 12B:
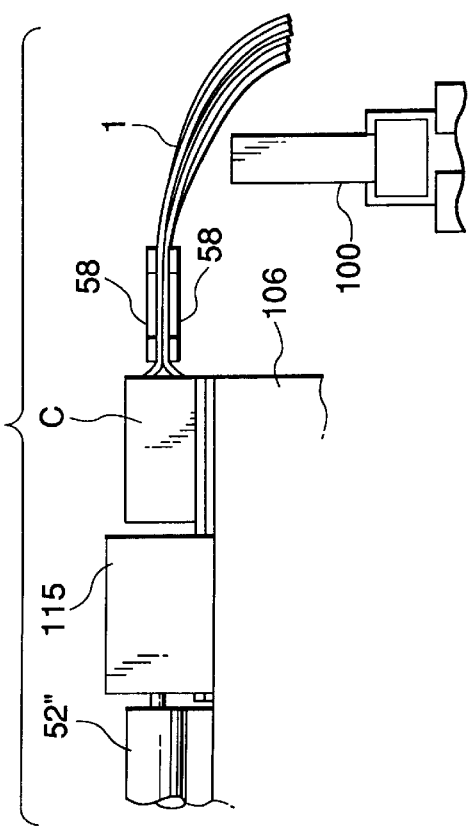

Next, as shown in FIG. 12B, in a state in which the upper and lower wire clamp plates 58 are closed to grip the group of wires 1, the connector receiving jig 115 is retracted by the actuation of the cylinder 52" and moves away from the proper connector C.

Next, as shown in FIG. 12C, at a position where the wire clamp plates 58 have been sufficiently raised by the actuation of the cylinder 52, the rotary head 57, i.e., the wire clamp plates 58, is rotated 90° by the driving of the motor 55. This sets the group of wires 1 and the proper connector C in a vertically oriented state.

Figure 12D:
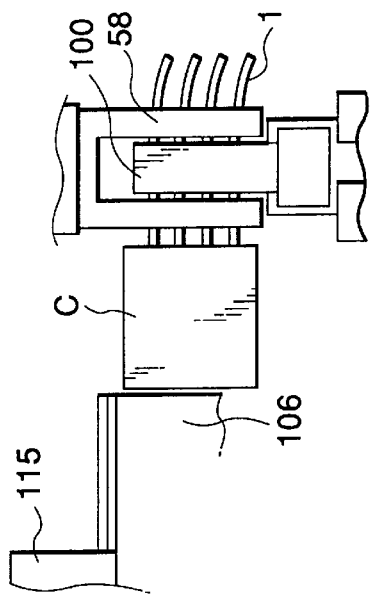

Finally, as shown in FIG. 12D, the wire clamp plates 58 are lowered, and inserts and retains the group of wires 1 in a vertical row into a desired wire clamp 100 (between a pair of clamp members 100a). As a result, in the stage of the partial harness H, it is possible to obtain the partial harness H in which the proper connector C is held in a vertical state.

As described above, by virtue of the second connector transferring device 50, it is possible to obtain the partial harness H in which the proper connector C is held in a vertical state with respect to the wire clamping bar 101.

Although, with reference to FIG. 11 and FIGS. 12A to 12D, a description has been given of the example in which the connector receiving jig 115 is provided in such manner as to be capable of advancing and retracting by means of the cylinder 52", an arrangement may be provided such that, instead of the connector receiving jig 115, the connector transferring device 50 is advanced or retracted by the cylinder 52', and the proper connector C together with the group of wires 1 is pulled out from the receiving jig 115.

What is claimed is:

1. A method of manufacturing a complete wire harness from a plurality of partial harnesses, the method comprising:

transferring a wire clamping bar which holds an initial one of the partial harnesses having a plurality of electric wires to a wire-harness fabricating station;

inserting terminals disposed at ends of said plurality of electric wires into predetermined terminal accommodating chambers of predetermined ones of a plurality of connectors set on a connector receiving jig in the wire-harness fabricating station;

removing the wire clamping bar which has been emptied; and repeating the steps of transferring, inserting and removing consecutively for ensuing ones of the partial harnesses so as to from said complete wire harness.

2. The method of manufacturing a wire harness according to claim 1, further comprising a step of transferring a proper connector fitted in advance to ends of predetermined ones of the electric wires of each of the partial harnesses to the connector receiving jig in the wire-harness fabricating station.

3. The method of manufacturing a wire harness according to claim 1, further comprising a step of collectively jointing, in the wire-harness fabricating station, two or more stripped portions of the electric wires included in each of the partial harnesses.

4. The method of manufacturing a wire harness according to claim 2, further comprising a step of collectively jointing, in the wire-harness fabricating station, two or more stripped portions of the electric wires included in each of the partial harnesses.

5. The method of manufacturing a wire harness according to claim 1, further comprising a step of jointing, in the wire-harness fabricating station, stripped portions of the ends of the electric wires included in each of the partial harnesses, such that the stripped portions are consecutively superposed one on top of another each time each of the partial harnesses is transferred to the wire-harness fabricating station.

6. The method of manufacturing a wire harness according to claim 2, further comprising a step of jointing, in the wire-harness fabricating station, stripped portions of the ends of the electric wires included in each of the partial harnesses, such that the stripped portions are consecutively superposed one on top of another each time each of the partial harnesses is transferred to the wireharness fabricating station.

* * * * *